United States Patent [19]

Nakatsu et al.

[11] Patent Number: 5,335,125
[45] Date of Patent: Aug. 2, 1994

[54] VIDEO SIGNAL MAGNETIC RECORDING AND REPRODUCING APPARATUS

[75] Inventors: Etsuto Nakatsu; Yoshihiro Morioka, both of Osaka; Masaaki Kobayashi, Kawanishi, all of Japan

[73] Assignee: Matsushita Electric Industrial Co., Ltd., Osaka, Japan

[21] Appl. No.: 969,482

[22] Filed: Oct. 30, 1992

[30] Foreign Application Priority Data

Nov. 1, 1991 [JP] Japan .................................. 3-287465

[51] Int. Cl.$^5$ ............................................. H04N 5/78
[52] U.S. Cl. .................................. 360/10.3; 360/33.1; 358/335
[58] Field of Search ..................... 360/32, 33.1, 21, 64, 360/10.1, 10.3; 358/341, 141, 312, 310, 335, 12, 15

[56] References Cited

U.S. PATENT DOCUMENTS

| | | | |
|---|---|---|---|
| 4,656,527 | 4/1987 | Uchimi | 358/320 |
| 4,862,292 | 8/1989 | Enari et al. | 360/33.1 X |
| 4,963,991 | 10/1990 | Honjo | 360/9.1 X |
| 5,050,010 | 9/1991 | Park | 360/33.1 |
| 5,065,259 | 11/1991 | Kubota et al. | 360/32 |

FOREIGN PATENT DOCUMENTS 59-104703 6/1984 Japan .
59-221802 12/1984 Japan .
2-239785 9/1990 Japan .

OTHER PUBLICATIONS

English Abstract of Document No. 2-239785, Yokodera VTR Device, Sep. 21 1990.
English Abstract of Document No. 59-221802, Takeuchi, Magnetic Recording and Reproducing Device, Dec. 13, 1984.
English Abstract of Document No. 59-104703 Minoura, Signal Recording method on Video Tape, Jun. 16, 1984.

*Primary Examiner*—Andrew L. Sniezek
*Attorney, Agent, or Firm*—Ratner & Prestia

[57] ABSTRACT

A video tape recorder capable of recording a normal definition video signal and a high definition video signal having an image quality higher than the normal one in a simulcast for broadcasting an identical program in a conventional broadcasting system and a high definition system. The common video signal is recorded in a conventional analog signal format at a tape feeding speed of the normal mode by an EP mode head defining a tracking width narrower than that of a standard mode head, while the high definition video signal is recorded in a digital form by a high definition video head additionally mounted on a rotary drum. Additionally, a common video signal recorded by a conventional video tape recorder can be reproduced.

2 Claims, 7 Drawing Sheets

58μm

VIDEO SIGNAL MAGNETIC RECORDING AND REPRODUCING APPARATUS

BACKGROUND OF THE INVENTION

1. Field of the Invention

The present invention relates to a recording and reproducing apparatus, and in more particular, to a video signal magnetic recording and reproducing apparatus such as a video tape recorder (VTR).

2. Description of the Prior Art

A conventional VTR has two tape feeding modes, one is a standard speed mode and the other is a one-third speed mode having a recording time period extended three times longer than that of the standard speed mode. In the one-third speed mode (referred to as "EP mode" hereinafter), there is used a magnetic head for the EP mode forming a track pattern having a track width reduced one-third of that of a standard speed mode head, enabling to record and reproduce a video signal at the tape feeding speed reduced to one third of the speed in the standard mode.

FIG. 7 shows a head arrangement of a conventional VTR in which a pair of standard mode heads 1 and 2 and another pair of EP mode heads 3 and 4 are mounted on a rotating drum 5, where the head members of each head pair are arranged in opposite directions at an angle of 180 degrees with respect to the rotating axis of the drum 5. A video signal is recorded as magnetic patterns on a magnetic tape 6.

FIG. 8 shows a recording track pattern when in the standard speed mode where the recording track width is approximately 58 μm.

Also, FIG. 9 shows a recording track pattern when in the EP mode where the recording track width is approximately 19 μm.

The signal to be recorded on a magnetic tape is a composition signal formed by multiplexing in frequency a frequency-modulated luminance signal and a down-converted chrominance signal, and the frequency allocation of the composition signal is generally indicated as shown in FIG. 3 the description of which is referred to later.

In a conventional VTR, however, when recording a video signal in a simulcast for broadcasting an identical program in both a conventional common broadcasting system and a high definition broadcasting system, the conventional VTR can only record the video signal in the conventional common broadcasting system (referred to as "common video signal" hereinafter), which means that the conventional VTR cannot record the video signal in the high definition broadcasting system (referred to as "high definition video signal" hereinafter) having an image quality higher than that of the common video signal.

SUMMARY OF THE INVENTION

Accordingly, an essential object of the present invention is to provide a video signal magnetic recording and reproducing apparatus capable of simultaneously recording and reproducing a conventional common video signal and a high definition video signal in simulcast while assuring the capability of reproducing a video signal recorded by means of a conventional VTR.

In order to achieve the above-mentioned objective, the present invention provides a video signal magnetic recording and reproducing apparatus which is capable of recording and reproducing a video signal in a standard mode as well as in a EP mode and also capable of simultaneously recording and reproducing a common video signal and a high definition video signal in simulcast for broadcasting an identical program in both a common broadcasting system and a high definition broadcasting system.

The video signal magnetic recording and reproducing apparatus of the present invention is characterized in that, on a rotating drum there are further provided a pair of high definition video heads having an azimuth angle different from the azimuth angle of each of a standard mode head pair and of a EP mode head pair provided besides. When simultaneously recording a common video signal and a high definition video signal, the common video signal is processed into an appropriate analog form through a first recording signal processing circuit and then recorded as a magnetic track pattern onto a magnetic tape by means of the EP mode head pair at a tape feeding speed of the standard mode, while the high definition video signal is processed into an appropriate digital form through a second recording signal processing circuit and then recorded by means of the high definition video head onto a track adjacent to each of the tracks on which the common video signal is recorded. When simultaneously reproducing the common video signal and high definition video signal recorded on the magnetic tape, the recorded common video signal is reproduced through the standard mode head or the EP mode head and then processed through a first reproduction signal processing circuit so as to be reproduced, while the recorded high definition video signal is reproduced through the high definition video head and then processed through a second reproduction signal processing circuit so as to be reproduced.

With the arrangement mentioned above, since the common video signal is recorded at the tape feeding speed of the standard mode by means of the EP mode head having a track width narrower than that of the standard mode head, therefore a high definition video signal can be simultaneously recorded by means of the other head. The common video recording signal format of the present apparatus is substantially the same as that of any conventional VTR except that the recording track width is narrower, and therefore any conventional image recorded by means of any conventional VTR can be reproduced by means of the apparatus of the present invention.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
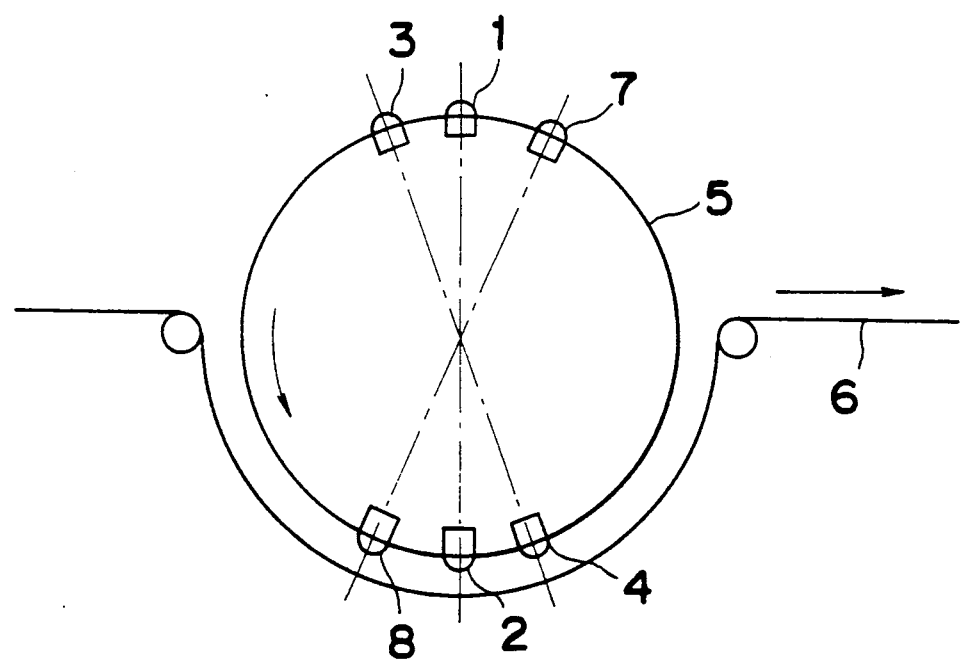
FIG. 1 is a schematic view of a head arrangement of a rotary drum of a video signal magnetic recording and reproducing apparatus in accordance with a first embodiment of the present invention.

Before the description proceeds, it is noted that since the basic structure of the video signal recording and reproducing apparatus of the present invention is similar to that of the conventional one, like parts are designated by the same reference numerals throughout the drawings.

FIG. 1 shows a magnetic head arrangement provided on a rotary drum of a video signal magnetic recording and reproducing apparatus in accordance with a first embodiment of the present invention.

Referring to FIG. 1, there are mounted a pair of standard mode magnetic recording heads 1 and 2 for use in a standard speed mode and a pair of EP mode magnetic recording heads 3 and 4 for use in an EP mode on a rotary drum 5 in a similar manner to a conventional one, where the members of each of the recording head pairs are arranged in opposite directions at an angle of 180 degrees. In addition to the head pairs, another pair of high definition video magnetic recording heads 7 and 8 are mounted in opposite directions at an angle of 180 degrees.

The high definition video heads 7 and 8 have azimuth angles different from the azimuth angles of the standard mode head pair and the EP mode head pair. For instance, the azimuth angle of each of the standard mode heads (1, 2) and the EP mode heads (3, 4) is ±6 degrees, while the azimuth angle of the high definition video heads (7, 8) is ±30 degrees. It is noted that the azimuth angle of the high definition video heads (7, 8) may be, for example, ±15 degrees or ±20 degrees other than ±30 degrees. Designated by reference numeral 6 is a magnetic tape serving as a magnetic recording medium.

Figure 2:
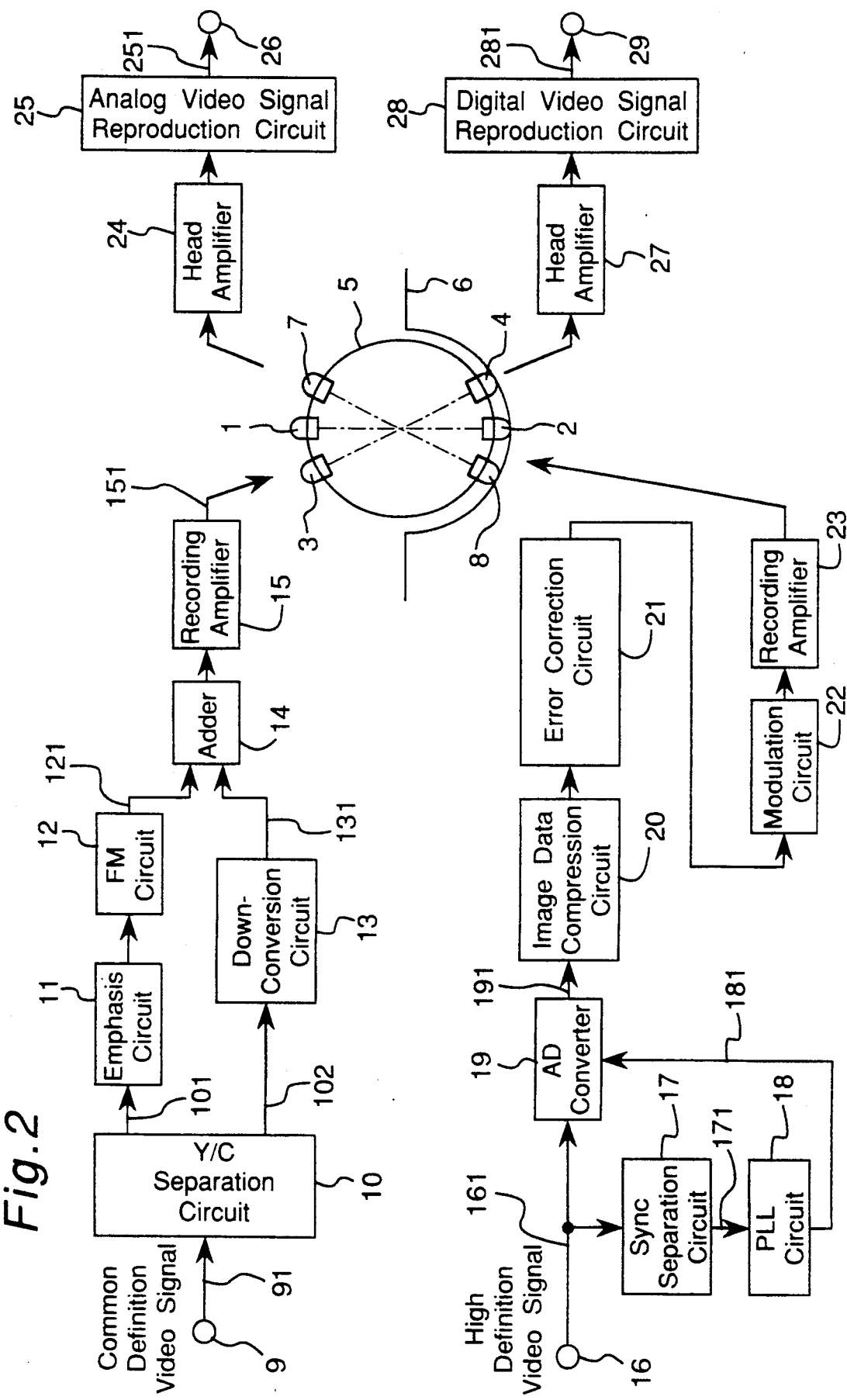
FIG. 2 is a block diagram of a video signal magnetic recording and reproducing apparatus of the first embodiment according to the present invention.

The following describes the operation of the present embodiment having a rotary drum constructed as mentioned above with reference to FIG. 2.

In a simulcast for simulcasting an identical program in both a conventional broadcasting system and a high definition broadcasting system, when a common video signal of an analog form and a high definition video signal of an analog form are simultaneously recorded onto the magnetic tape 6, a simulcast recording mode is selected by means of a mode selection switch (not shown) which selects one mode between the normal broadcast recording mode and the simulcast recording mode. When the simulcast recording mode is selected, the EP mode head pair 3 and 4 are selected as a magnetic recording head pair for recording a common video signal, while the high definition video head pair 7 and 8 are selected as a magnetic recording head pair for recording a high definition video signal. At the same time, the standard tape feeding speed is selected as a tape feeding speed.

The common video signal of an analog form is input to an input terminal 9, while the high definition video signal is input to another input terminal 16. The common video signal 91 input through the input terminal 9 is separated into a luminance signal 101 and a chrominance signal 102 by means of a Y/C separation circuit 10. The luminance signal 101 is transmitted via an emphasis circuit 11 to a frequency modulation circuit 12 to be modulated in frequency. Meanwhile, the chrominance signal 102 is subject to a down-conversion in a down-conversion circuit 13. The frequency-modulated luminance signal 121 output from the FM circuit 12 and the down-converted chrominance signal 131 output from the down-conversion circuit 13 are added together in an adder 14 and then transmitted to a recording amplifier 15. The resultant amplified analog signal 151 is fed to the EP mode heads 3 and 4 provided on the rotary drum 5 so as to be recorded on the magnetic recording tape 6.

Figure 3:
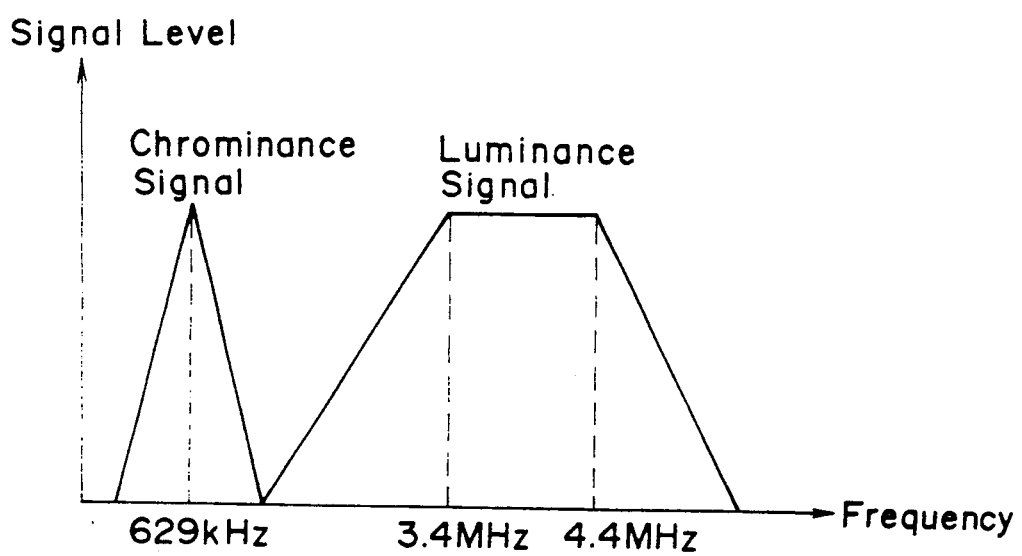
FIG. 3 is a graph showing a recording signal frequency allocation at the time of recording a common video signal.

FIG. 3 shows a frequency allocation of the recording analog signal 151 output from the recording amplifier 15, where the frequency-modulated luminance signal 121 has a relatively high frequency while the chrominance signal 131 has a relatively low frequency. The luminance FM signal 121 has a former synchronization edge at a frequency of approximately 3.4 MHz and a latter peak edge representing 100% white luminance at a frequency of approximately 4.4 MHz. Therefore, the frequency deviation width becomes 1.0 MHz. Meanwhile, the down-converted chrominance signal 131 has a peak value at its center frequency of approximately 629 kHz.

Referring back to FIG. 2, the magnetic tape 6 is fed at a tape feeding speed of the standard mode. The recording analog signal 151 is recorded onto the magnetic tape 6 by means of the EP mode heads 3 and 4 to thereby complete the record of the common video signal.

Meanwhile, regarding to the high definition video signal 161 of an analog form input through the input terminal 16, a sync signal 171 is separated from the high definition video signal 161 by means of a sync separation circuit 17 to generate a clock signal 181 having a cycle of 1/N (N: integer) of the sync pulse interval through a phase-locked loop (PLL) circuit 18. The high definition video signal 161 is converted into a digital signal 191 at the timing of the clock signal 181 in an analog-to-digital converter 19. When an 8-bit analog-to-digital converter is used, the data amount of the digital signal 191 is 8×N bits per a sync signal interval. The digital signal 191 is compressed in data amount by an image data compression circuit 20. As a data compression method, a well-known method of DCT (Discrete Cosine Transform) or the like is used. The digital signal compressed in data amount incorporates therein error correction data by means of an error correction data incorporation circuit 21. As an error correction method, well-known reed-solomon error correction codes or the like method are used. The digital signal incorporated with the error correction data is modulated by means of a modulation circuit 22. As a modulation method, a well-known scrambled NRZ modulation method or eight-to-ten conversion method is used. The modulated signal is transmitted via a recording amplifier 23 to the high definition video heads 7 and 8 on the rotary drum 5 thereby to record a high definition image on the magnetic tape 6.

Figure 4:
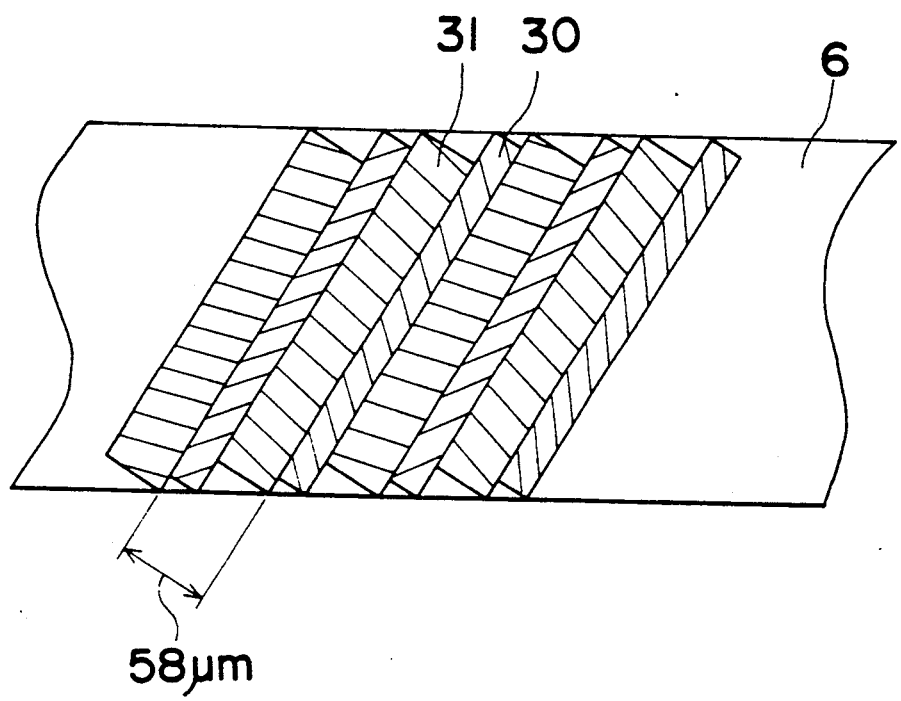
FIG. 4 is a schematic view of recording tracks of a common video signal and a high definition video signal recorded simultaneously.

As shown in FIG. 4, the magnetic recording tape 6 having both the common video signal and the high definition video signal recorded thereon has a track arrangement where a common video signal recording track 30 and a high definition video signal track 31 are formed in adjacent alternately one after another and the width of the two kinds of the tracks 30 and 31 is approximately 58 μm, wherein the width of the high definition video signal track 31 is approximately two times as that of the common video signal track 30.

Referring back to FIG. 2, with regard to the reproducing operation of the recorded video signals, the common video signal recorded on the common video signal recording track 30 is reproduced by means of the EP mode heads 3 and 4 or the standard speed mode heads 1 and 2. The reproduced common video signal of an analog form is input via a head amplifier 24 to an analog video signal reproduction circuit 25. The analog video signal reproduction circuit 25 performs signal processing operations counter to the signal recording processing operations performed by means of the circuits 10 through 14. In more detail, a reproduced luminance signal is demodulated in frequency to be formed into a reproduction luminance signal, while a reproduced chrominance signal is converted into a reproduction chrominance signal. The reproduction luminance signal and the reproduction chrominance signal are added to be output from an output terminal 26 as a reproduction common video signal 251.

Meanwhile, the high definition video signal recorded on the high definition video signal recording track 31 is reproduced by means of the high definition video heads 7 and 8. The reproduced high definition video signal of a digital form is input via a head amplifier 27 to a digital video signal reproduction circuit 28. The digital video signal reproduction circuit 28 performs a signal processing operations counter to the signal recording processing operations performed by means of the circuits 17 through 22. In more detail, the circuit 28 detects a digital signal, corrects errors, expands the compressed digital signal into the original signal, and converts the signal from digital form to analog form thereby to output the resulting signal from an output terminal 29 as a reproduction high definition video signal 281.

Although the above described the case where a common video signal and a high definition video signal are recorded or reproduced simultaneously, it is noted here that, when a common video signal is only recorded and reproduced, the normal broadcast recording mode is selected by means of the mode selection switch, any one of the tape feeding speed modes is selected between the standard mode and the EP mode. Thus, the recording and reproducing operation of only the common video signal is performed by means of the head pair corresponding to the selected tape speed mode at a corresponding tape feeding speed.

A second embodiment of a video signal magnetic recording and reproducing apparatus according to the present invention is explained with reference to FIGS. 5 and 6.

Figure 5:
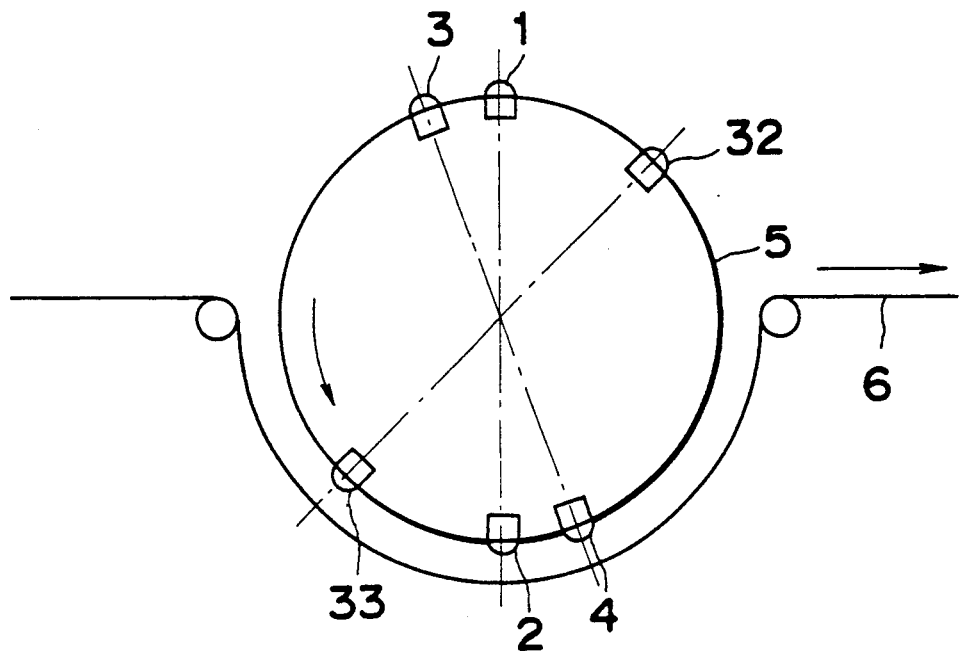
FIGS. 5 is a schematic view of a head arrangement of recording head pairs where an audio head pair concurrently serves as a high definition recording head.
Figure 7:
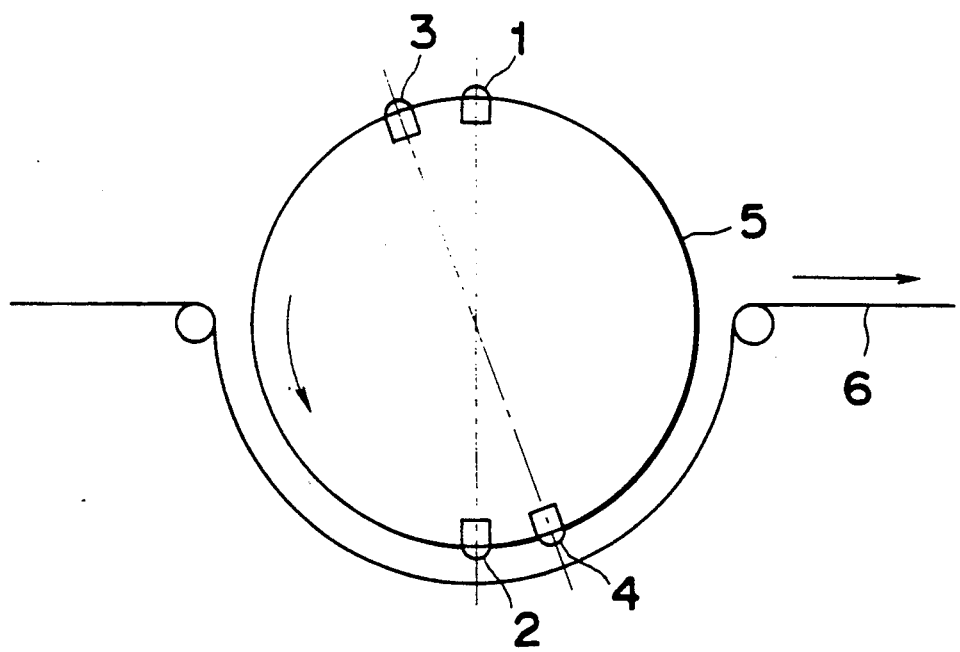
FIG. 7 is a schematic view of a head arrangement on a rotary drum of a conventional VTR.

As shown in FIG. 5, on the rotary drum 5 there are provided a pair of audio heads 32 and 33 in opposite directions at an angle of 180 degrees instead of providing a pair of high definition video heads. The audio heads serve as magnetic recording heads for recording an audio signal in a digital form and have an azimuth angle of ±30 degrees. The audio heads 32 and 33 may concurrently serve as high definition video heads. With the above arrangement, the high definition video heads can be eliminated with the provision of a selecting function between a high definition video signal and an audio signal, thereby enabling to reduce the manufacturing cost.

Figure 6:
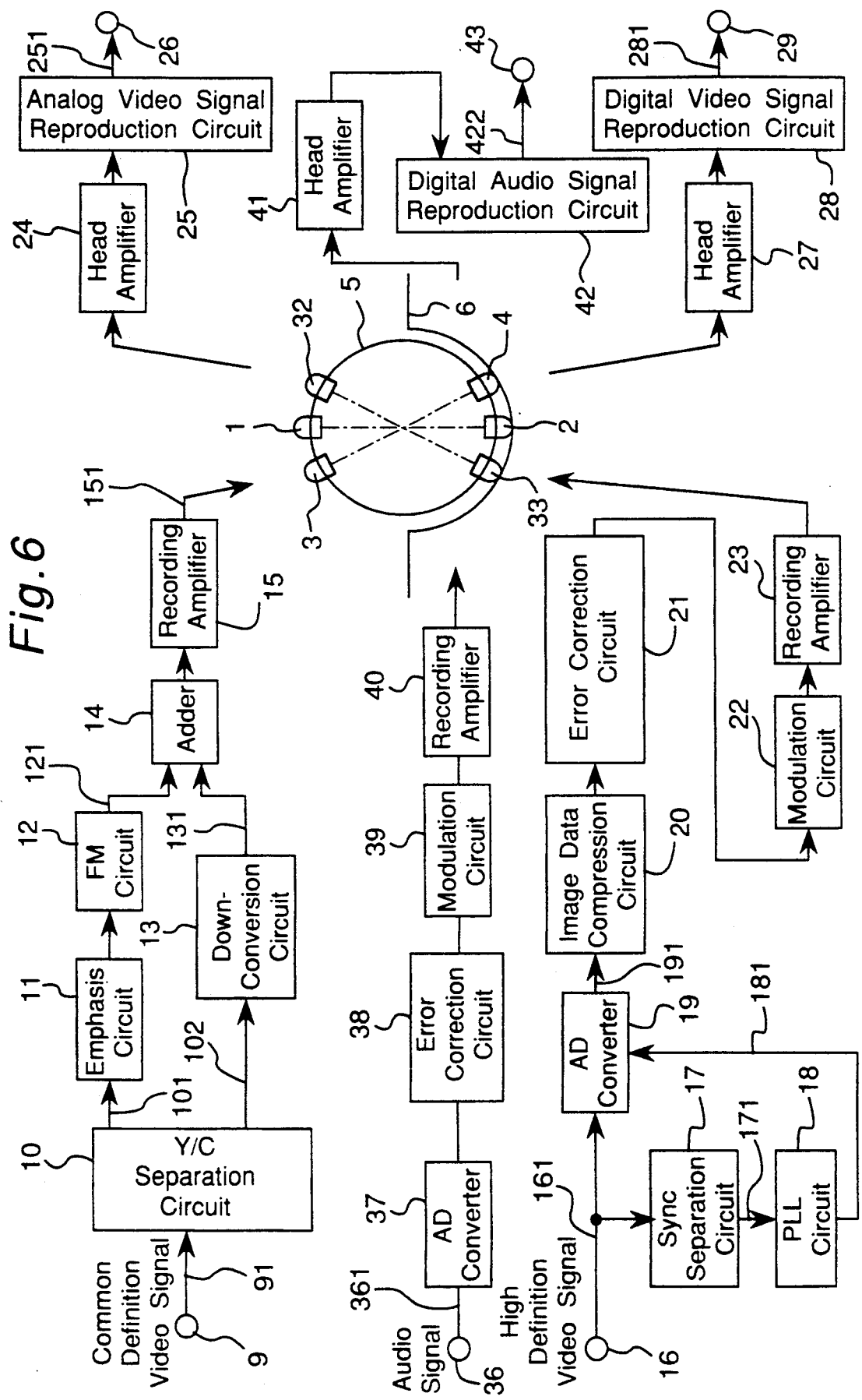
FIG. 6 is a block diagram of a video signal magnetic recording and reproducing apparatus in accordance with a second embodiment of the present invention.
Figure 8:
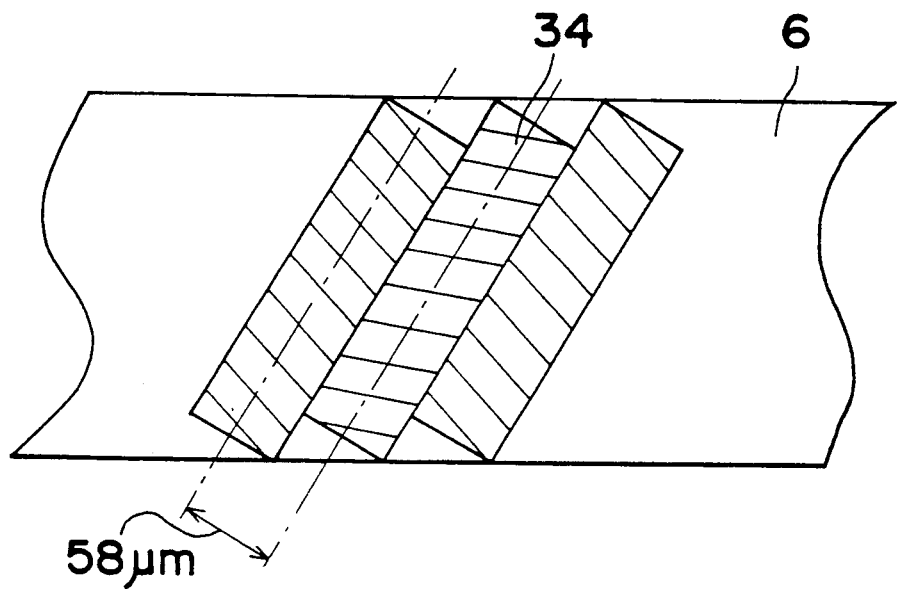
FIG. 8 is a schematic view of recording tracks on a tape where a video signal is recorded in a standard mode by means of a conventional VTR.
Figure 9:
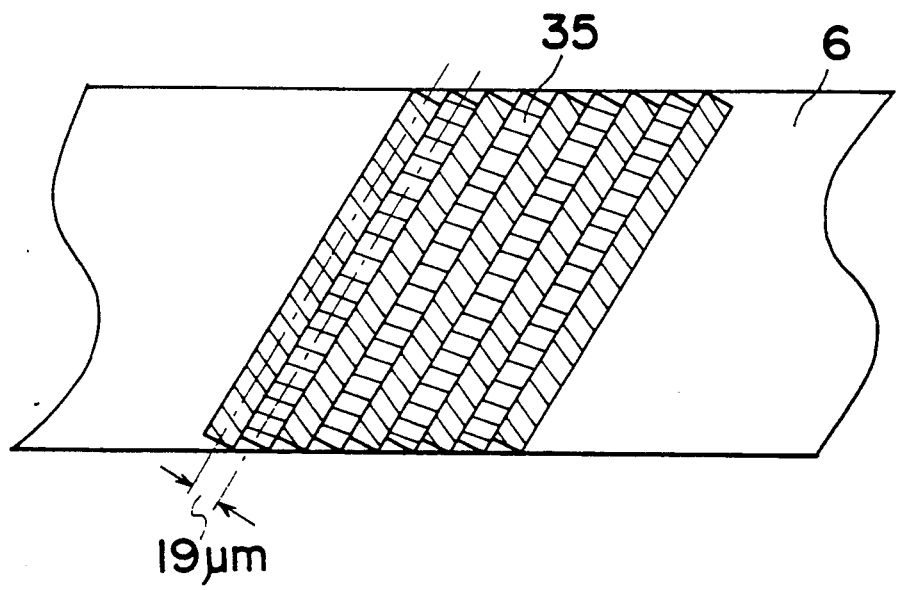
FIG. 9 is a schematic view of recording tracks on a tape where a video signal is recorded in an EP mode by means of a conventional VTR.

The following describes the operation of the second embodiment with reference to FIG. 6. Since the operation of the second embodiment shown in FIG. 6 is basically similar to that of the first embodiment shown in FIG. 2, redundant explanation is omitted here. In a recording and reproducing operation in simulcast, a different point between the first embodiment and the second embodiment is only in that the audio heads 32 and 33 are used instead of the high definition video heads 7 and 8.

In a case where only a common video signal is recorded and reproduced, the recording and reproducing operation is performed by means of a corresponding head pair at a tape feeding speed corresponding to any one mode selected between the standard speed mode and the EP mode. In this case, the audio heads 32 and 33 are used for recording and reproducing an audio signal.

As shown in FIG. 6, when in the operation of recording an audio signal 361 of an analog form, the audio signal 361 input to an input terminal 36 is converted into a digital form by means of an analog-to-digital converter 37. The digital signal incorporates therein error correction data by means of an error correction data incorporation circuit 38. The digital signal incorporated with the error correction data is modulated by means of a modulation circuit 39. The modulated signal is transmitted via a recording amplifier 40 to the audio heads 32 and 33 on the rotary drum 5 so as to be recorded on the magnetic tape 6.

When in the operation of reproducing the recorded audio signal, the audio signal recorded on the magnetic tape 6 is reproduced by means of the audio heads 32 and 33, and thereafter input to a digital audio signal reproduction circuit 42 via a head amplifier 41. The digital audio signal reproduction circuit 42 performs signal processing operations counter to the signal recording operations performed by means of the circuits 37 through 39. In other words, in the circuit arrangement 42, the digital audio signal is detected and the error is corrected so as to be converted into a digital form. The converted digital signal is output from an output terminal 43 as an audio reproduction signal 422.

Although the present invention has been fully described by way of examples with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A video signal magnetic recording and reproducing apparatus capable of recording and reproducing a video signal in a standard speed mode and an extended play (EP) mode and capable of simultaneously recording and reproducing a composite video signal consisting of a first video signal with normal definition and a second video signal with high definition in a simulcast for broadcasting an identical program in both a conventional broadcasting system and a high definition broadcasting system, said video signal magnetic recording and reproducing apparatus comprising:

a rotating drum including a first magnetic head pair for recording and reproducing the video signal in the standard speed mode, a second magnetic head pair for recording and reproducing the video signal in the EP mode and for recording and reproducing the first video signal in the standard speed mode and a third magnetic head pair for recording and reproducing the second video signal in the standard speed mode, said third magnetic head pair having an azimuth angle different from those of the first and second magnetic head pairs;

a magnetic recording medium in which said first and second video signal are recorded;

first recording signal processing means for receiving and processing the first video signal to obtain an analog recording signal which is to be recorded onto a first track pattern formed on said magnetic recording medium by the second magnetic head pair at the standard speed mode;

second recording signal processing means for receiving and processing the second video signal to obtain an analog recording signal which is to be recorded onto a second track pattern formed on said magnetic recording medium by the third magnetic head pair at the standard speed mode, wherein the analog recording signal and the digital recording signal are simultaneously recorded in a simulcast such that each track of said second track pattern is adjacent to each track of said first track pattern;

first reproduction signal processing means for processing a recorded first video signal reproduced from said magnetic recorded medium by any one of said first and second magnetic head pairs to output a reproduction first video signal; and second reproduction signal processing means for processing a recorded second video signal reproduced from said magnetic recorded medium by said third magnetic head pair to output a reproduction second video signal when reproducing the recorded second video signal in a simulcast.

2. The apparatus as claimed in claim 1, wherein said second recording signal processing means further comprises an analog-to-digital converter unit for converting said second video signal from an analog form into a digital signal and an image data compression unit for compressing the digital signal in data amount.

* * * * *

UNITED STATES PATENT AND TRADEMARK OFFICE
CERTIFICATE OF CORRECTION

PATENT NO.    : 5,335,125
DATED         : August 2, 1994
INVENTOR(S)   : Nakatsu et al.

It is certified that error appears in the above-identified patent and that said Letters Patent is hereby corrected as shown below:

```
In the Letters Patent, column 7, line 22, change the words
"an analog" to --a digital--.
```

Signed and Sealed this

First Day of November, 1994

Attest:

Attesting Officer

BRUCE LEHMAN

Commissioner of Patents and Trademarks